(12) United States Patent
Moubedi et al.

(10) Patent No.: US 12,027,896 B2
(45) Date of Patent: *Jul. 2, 2024

(54) CHARGING CABLE PORT DETECTION AND CURRENT ENFORCEMENT

(71) Applicant: Snap Inc., Santa Monica, CA (US)

(72) Inventors: Shaheen Moubedi, Los Angeles, CA (US); Russell Douglas Patton, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,326

(22) Filed: May 2, 2023

(65) Prior Publication Data

US 2023/0268748 A1 Aug. 24, 2023

Related U.S. Application Data

(63) Continuation of application No. 17/567,227, filed on Jan. 3, 2022, now Pat. No. 11,658,492, which is a continuation of application No. 16/799,359, filed on Feb. 24, 2020, now Pat. No. 11,218,007.

(60) Provisional application No. 62/827,023, filed on Mar. 30, 2019.

(51) Int. Cl.
| | | |
|---|---|---|
| *H01M 10/44* | (2006.01) | |
| *H01M 10/46* | (2006.01) | |
| *H02J 7/00* | (2006.01) | |
| *H01R 24/20* | (2011.01) | |
| *H01R 24/66* | (2011.01) | |
| *H01R 103/00* | (2006.01) | |

(52) U.S. Cl.
CPC ........ *H02J 7/00304* (2020.01); *H02J 7/0042* (2013.01); *H02J 7/007* (2013.01); *H01R 24/20* (2013.01); *H01R 24/66* (2013.01); *H01R 2103/00* (2013.01)

(58) Field of Classification Search
CPC ...... H02J 7/007; H02J 7/00304; H02J 7/0042; H01R 2103/00; H01R 24/66; H01R 24/20
USPC .............. 320/111, 114, 128, 135; 439/43, 46
See application file for complete search history.

(56) References Cited

U.S. PATENT DOCUMENTS

| | | | |
|---|---|---|---|
| 11,218,007 B1 * | 1/2022 | Moubedi | ............. H02J 7/00304 |
| 11,658,492 B2 | 5/2023 | Moubedi et al. | |
| 2012/0028480 A1 | 2/2012 | Bilbrey et al. | |
| 2017/0271894 A1 | 9/2017 | York et al. | |

FOREIGN PATENT DOCUMENTS

| | | |
|---|---|---|
| WO | 2006102419 A2 | 9/2006 |
| WO | 2018232644 A1 | 12/2018 |

\* cited by examiner

*Primary Examiner* — Edward Tso
(74) *Attorney, Agent, or Firm* — Culhane PLLC; Stephen J. Weed (57) ABSTRACT

A charging cable configured to obtain power from different power supply devices for delivery to a chargeable electronic device, and to techniques and equipment to enable the charging cable to identify current limitation of the connected power supply device and to enforce that current limit via the charging cable. The charging cable has a logic circuit coupled to signal pins to detect a signal indicating a power limitation of the power supply device. The logic circuit controls a current limiter connected in the power delivery bus of the charging cable to limit current flowing through the charging cable.

20 Claims, 9 Drawing Sheets

CHARGING CABLE PORT DETECTION AND CURRENT ENFORCEMENT

CROSS-REFERENCE TO RELATED APPLICATIONS

This application is a Continuation of U.S. application Ser. No. 17/567,227 filed on Jan. 3, 2022, which is a Continuation of U.S. patent application Ser. No. 16/799,359 filed on Feb. 24, 2020, now U.S. Pat. No. 11,218,007, which claims priority to U.S. Provisional Application Ser. No. 62/827,023 filed on Mar. 30, 2019, all of which are incorporated fully herein by reference.

TECHNICAL FIELD

The subject matter herein relates to a charging cable configured to obtain power from different power supply devices for delivery to a chargeable electronic device, and to techniques and equipment to enable the charging cable to identify current limitation of the connected power supply device and to enforce that current limit via the charging cable.

BACKGROUND

Many chargeable electronic devices, such as portable or wearable devices, have integrated electronics requiring an onboard power supply in the form of a battery. Such devices are coupled to a source of power to charge the battery. This approach to charging often uses a charging cable connected to the power supply via a power supply device to a suitable receiver on the chargeable electronic device.

For example, a charging cable may connect between a port of a power supply device (e.g., plugged into an AC mains type wall outlet) and a receiver on the chargeable electronic device. Such a power supply device, implemented as a standalone device, is sometimes called a "charging brick."

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The descriptions of the examples that follow are intended to be read in connection with the accompanying drawings, which are to be considered part of the entire written description. In the description, relative terms such as "right," "left," "lower," "upper," "horizontal," "vertical," "above," "below," "up," "down," "top," and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling, and the like, such as "coupled," "connected" and "interconnected," refer to a relationship wherein structures are secured or attached to one another either directly or indirectly through intervening structures, as well as both removable or rigid attachments or relationships, unless expressly described otherwise.

The various examples disclosed herein relate to a charging cable used in the charging of a battery-powered chargeable electronic device, to systems that combine such a charging cable and the chargeable electronic device, and to circuitry of the charging cable for identifying a charging current limitation of a power supply device, enforcing the current limitation, and providing power to the chargeable electronic device.

Figure 1:
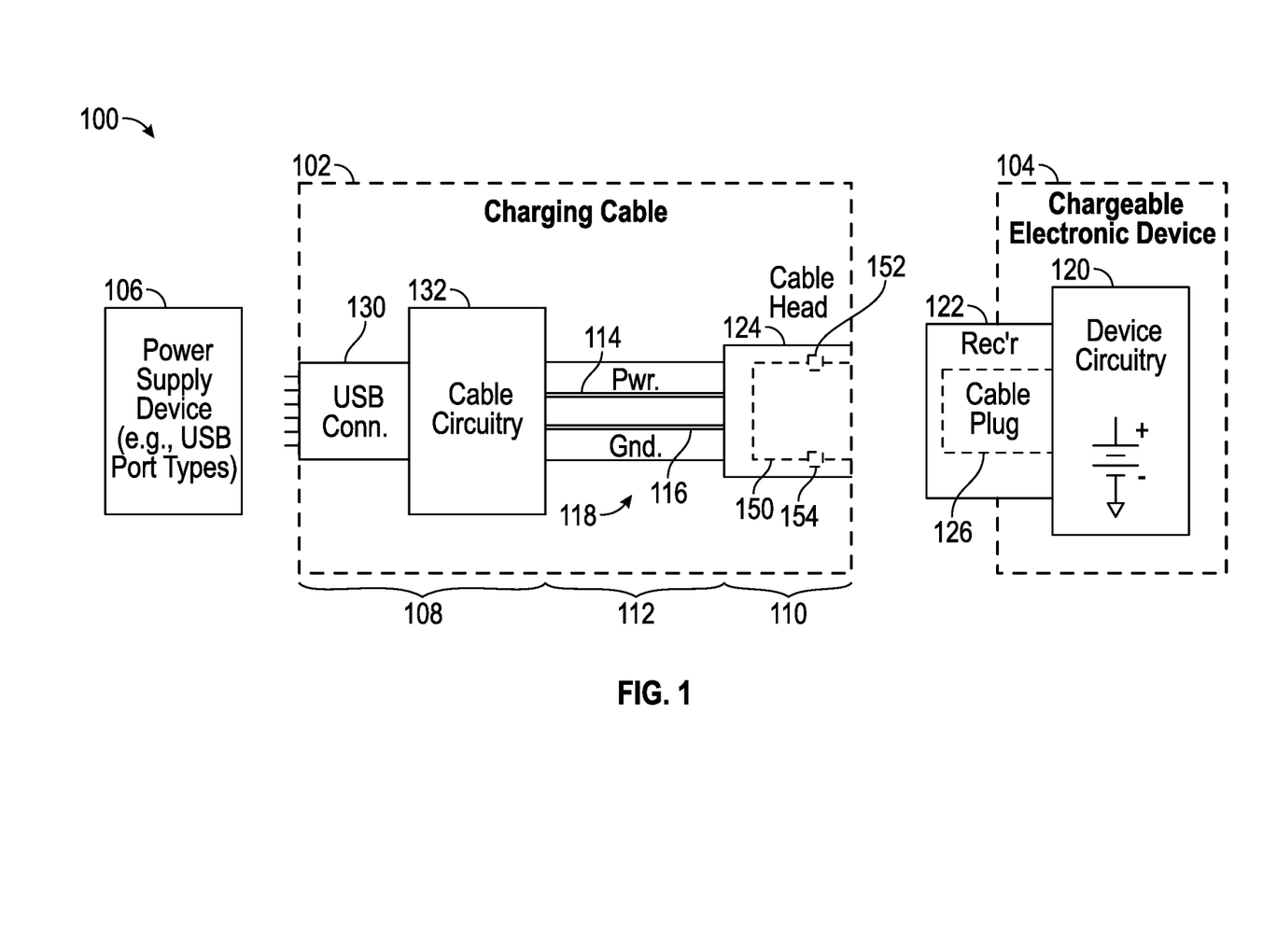
FIG. 1 is a block diagram of an example combination or system, including a power supply device, a charging cable, and a chargeable electronic device, with circuitry in the charging cable for detecting a current limitation of the power supply device and enforcing the current limitation on current drawn through the cable by the chargeable electronic device.

Reference now is made in detail to the examples illustrated in the accompanying drawings and discussed below. FIG. 1 illustrates an example of the overall combination of elements forming a system 100. As shown, the system 100 includes a charging cable 102 and a chargeable electronic device 104. In use, the charging cable 102 interconnects the chargeable electronic device 104 to a power supply device 106 for charging the chargeable electronic device 104.

The power supply device 106 supplies power for delivery by the charging cable 102 to the chargeable electronic device 104. In an example, the power supply device receives AC mains power from an AC mains type wall outlet and converts the AC mains power to DC power (e.g., an AC charger sometimes referred to as a "charging brick"). In other examples, the power supply device is a battery powered device, a computer, a wall adapter, or a car charger. The power supply device 106 has a connector (not shown; e.g., a female USB connector) for interconnection with a mating connector of the charging cable 102.

Different power supply devices 106 offer different power output capabilities ("port types"), even if they utilize a common or standard connection port (e.g., a USB connection port) for the interconnection with the charging cable 102. For example, a power supply device 106 configured to implement USB Battery Charging Specification Revision 1.2 ("BC1.2") is configurable as a charging downstream port (CDP; having a power output capability limited to 1.5 Amps), a dedicated charging port (DCP; having a power output capability limited to 1.5 Amps), and/or a standard downstream port (SDP; having a power output capability limited to 0.5 Amps). Additionally, power supply devices may be configured to implement proprietary standards having other power output capabilities (e.g., limited to 1.0 Amps, 2.0 Amps, 2.4 Amps, or higher).

Power supply devices 106 that provide power through a USB connection typically have four or more contacts pads. In one example, the USB connection of the power supply device 106 includes a power contact pad (VBUS; +5 Volts), a ground contact pad (GND), a positive data contact pad (D+) and a negative contact pad (D−). The USB connection may include additional contact pads, e.g., a first configuration channel (CC1) and a second configuration channel (CC2). The power and ground contact pads are referred to herein as power pads and the other contact pads are referred to herein as data pads. Although a USB implementation is described in detail herein, it will be understood that other connector type implementation may be used where a current limitation of the power supply device is determinative from signals received by the charging cable 102 from the power supply device 106.

The power supply devices 106 convey one or more of their power output capabilities (e.g., current limitation) through signals (e.g., one or more voltage levels and/or data signals) presented on their data pads. For example, in a USB implementation, equal voltage levels on D+ and D− may be indicative of a 1.5 Amp current limitation, 2.0 Volts on D+ and 2.7 Volts on D− may be indicative of a 1.0 Amp current limitation, and 2.7 Volts on D+ and 2.0 Volts on D− may be indicative of a 2.0 Amp current limitation. Additionally, signals and/or voltage levels on one or more other contact pads (e.g., CC1 and CC2) may be indicative of other current limitations.

The charging cable 102 includes a first cable connector 108 (tail connector) for connection with a mating connector (e.g., USB connector) of the power supply device 106, a second cable connector 110 for connection with a mating connector of the chargeable electronic device 104, and a cable bus 112 connecting the first cable connector 108 to the second cable connector 110.

The cable bus 112 is a power delivery bus that includes a power line 114 and a ground line 116. A flexible sheath 118 (e.g., a polymer, fabric, and/or braided metal strand, natural fiber and/or manmade fiber sheath) surrounds the power delivery bus including the power line 114 and the ground line 116. In an example, the cable bus 112 does not include data lines or circuitry. In accordance with this example, a more flexible cable bus 112 is producible in contrast to cable busses including circuitry and/or additional lines for data.

Figure 3:
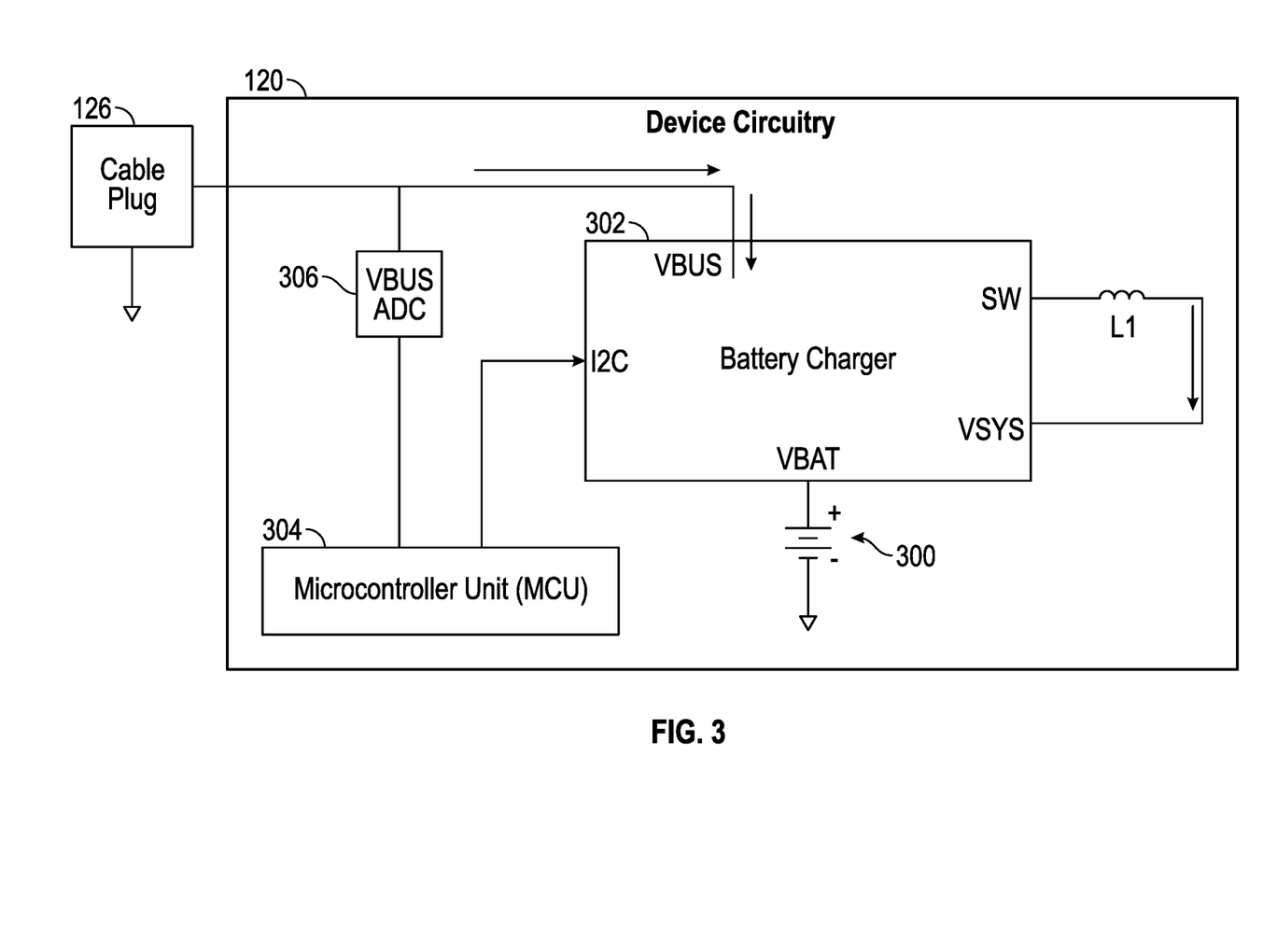
FIG. 3 is a block diagram of an example of the chargeable electronic device.

The chargeable electronic device 104 includes device circuitry 120 having a battery 300 and a battery charger circuit 302 coupled to the battery 300 (FIG. 3). The chargeable electronic device 104 also includes a receiver 122 for coupling to a cable head 124 of the charging cable 102. Although other types of receivers may be used, the example receiver 122 allows for rotatable coupling and, for example, includes a cable plug 126 that includes first and second charging contact pads to supply charging current/power to the device circuitry 120.

Figure 2:
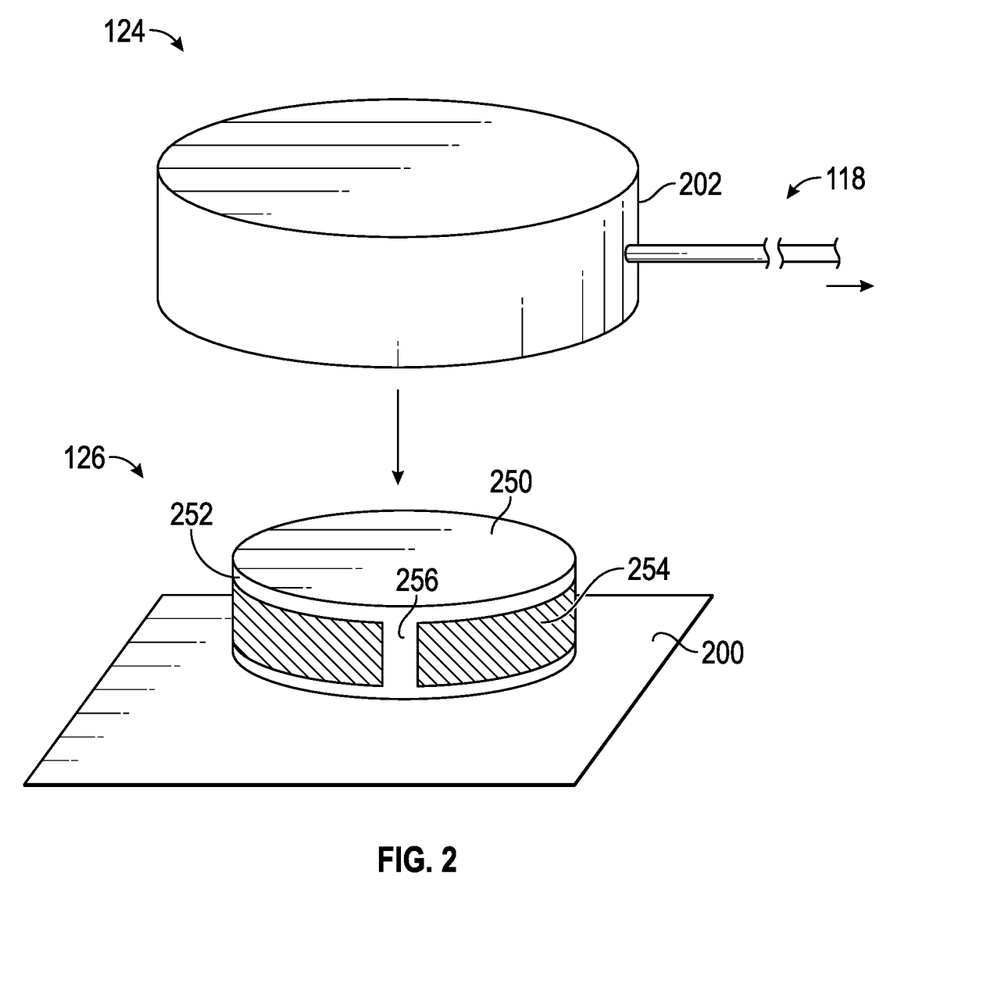
FIG. 2 is an isometric view of an example of a cable connector on a head of the charging cable (e.g., a socket) and an example of a mating connector (e.g., a plug) of the chargeable electronic device.

In an example shown in FIG. 2, the cable plug 126 is a cylindrical post extending from a wall 200 of a housing or the like of the chargeable electronic device 104. The cable plug 126 is configured for insertion into a cylindrical implementation of the recess 150 (FIG. 1), which would be formed in a socket 202 of the cable head 124. Although other shapes may be used, a substantially round cylindrical shape is particularly effective at enabling rotation of a cable head having an appropriately shaped mating socket recess 150.

The contact pads of the cable plug 126 include a power contact pad 252 coupling supply current to the device circuitry 120 (e.g., via pin 152 or 154 of the cable head 124 in the recess 150), a ground contact pad 254 coupled to ground of the chargeable electronic device 104 (e.g., via pin 152 or 154 of the cable head 124 in the recess 150), and an insulator 256 electrically separating the power contact pad 252 and the ground contact pad 254. Each of the exposed insulating regions 256 can be relatively small so as to minimize the size of any potential deadzone (i.e., area where a pin is not in contact with either pad). For example, the region 256 may only be large enough to avoid electrical current flow across the region from an end of one contact pad to the adjacent end of the other contact pad. In another example, the region 256 may be slightly wider than the width of the pins 55, 57 (or the width of largest of the pins 57, 59) of the cable head 124 so that a pin in the cable head cannot concurrently contact both contact pads 252, 254.

It should be apparent that the contacts or contact pads of the receiver need not strictly be power or ground; and either pad may serve the alternate function. For convenience only, further discussion of the non-limiting examples will sometimes refer to a specific contact or pad as a power contact pad and the other contact or pad as a ground contact pad. Although the description herein describes a specific example of the second cable connector 110 of the charging cable 102 and the cable plug 126 of the chargeable electronic device 104, it is to be understood that this in only one example and that the disclosed subject matter may utilize other types of connectors for interconnecting the charging cable with the chargeable electronic device such as a conventional 2-wire connector.

Referring back to FIG. 1, the charging cable 102 includes a connection to power. Although other types of connectors and associated power sources may be used, the power connector in the example is a male USB type connector 130. Although not necessarily a part of the system 100, the drawing also shows a compatible power source that, in an example using USB connector 130, would be a USB power source.

The power and ground lines 114 and 116 connect the cable circuitry 132 to the cable head 124. In an example, a housing of the first cable connector 108 contains the connector 130 and the cable circuitry 132. Connections of the cable circuitry 132 to the pins of the connector 130 (for connection with the pads of the mating connector in the power supply device 106) are not separately shown. The illustrated arrangement, however, is a non-limiting example, and other arrangements of the cable elements may be used. In an alternative configuration, there may be an additional wire bundle between the connector 130 and the cable circuitry 132, possibly with additional wires (e.g., data bus wires), with the cable circuitry positioned in the cable bus 112 adjacent the connector 130.

FIG. 3 is a functional block diagram of an example of elements of the chargeable electronic device 104, which here includes the device circuitry 120 and a cable plug 126. Although other receiver and contact pad arrangements may be used, the cable plug 126 in the device example of FIG. 3 may be implemented as discussed above relative to FIG. 2 so as to include two charging contact pads. With such an example configuration, a contact pad for power is coupled to supply power to the battery charger circuitry 302 at the VBUS port. The other contact pad connects to the ground of the chargeable electronic device 104. The device circuitry 120 includes the battery 300 and the battery charger 302 coupled to the battery 300. A variety of known circuits may be used to implement the battery charging circuitry 120, for example, based on the type and size of the battery 300. The positive terminal of the battery 300 connects to the battery charger 302, and the negative terminal of the battery 300 connects to the ground of the chargeable electronic device 104.

Device electronics if any that may draw power from the battery 300 for general functions of the device (other than the charging functions under consideration herein) are omitted for convenience. The charging cable and charging technologies discussed here, may apply to any of a wide variety of portable or wearable devices that utilize rechargeable batteries to power the particular electronic components or act as a battery pack to supply charge to other equipment.

The device circuitry 120 also includes a device controller 304. Although discrete logic, a field programmable gate array, other programmable processor or the like may be used, the example utilizes a programmable micro-control unit (MCU) as the controller 304 of the chargeable electronic device 104. In the example chargeable electronic device 104, the MCU 304 is responsive to power from the cable plug 126 and is coupled and configured to control the operation of the battery charger 302.

An MCU typically is a system on a chip (SoC) including a processor, memory, peripheral input/output (I/O) interfaces and ports, and possibly other circuit components. For example, a single SoC might incorporate the battery charger circuitry as well as circuitry forming the MCU. For purposes of the present discussion, the MCU 304 controls functions related to charging of the battery 300, although the MCU 304 may perform other functions relative to the chargeable electronic device 104 depending on the device type or applications for the particular electronic chargeable device 104. Functions of the MCU 304 are determined by executable program instructions or configuration data installed in the memory of the MCU 304, e.g. as firmware.

In an example, the battery charger 302 is a programmable battery charger having an inter-integrated circuit (I2C) port for configuring parameters of the battery charger 302. The MCU 304 configures battery charger 302 via the I2C port by sending parameter value settings such as maximum current draw, which are stored by the battery charger 302. The MCU 304 monitors voltage and current received from cable plug 126 via an analog to digital converter (ADC) 306 during a battery charger setup phase upon connection of a charging cable 102 to the cable plug 126. During the setup phase, the battery charger ramps up current draw. The MCU monitors the current and voltage during the ramp up. When the MCU 304 detects a voltage drop at VBUS, it identifies the voltage drop as being caused by the current being drawn by the chargeable electronic device 104 reaching the current limit imposed by the charging cable 102 and records the current level at VBUS just prior to the voltage drop (e.g., within 100 ms of the voltage drop) in order to maximize power draw under the given current limit. The MCU then configures the battery charger 302 to not exceed the current level recorded just prior to the voltage drop.

Battery charger 302 also includes an inductor (L1) coupled between a switched port (SW) and a system voltage port (VSYS). The battery charger 302 monitors the system voltage at port VSYS to ensure that battery charge 302 is not drawing more current from the charging cable 102 via the cable plug 126 that the current limit set by the MCU 304 and stored in the battery charger 302. Suitable ADCs 306, MCUs 304 and battery chargers 302 for use within the chargeable electronic device 104 will be understood by one of skill in the art from the description herein.

Figure 4:
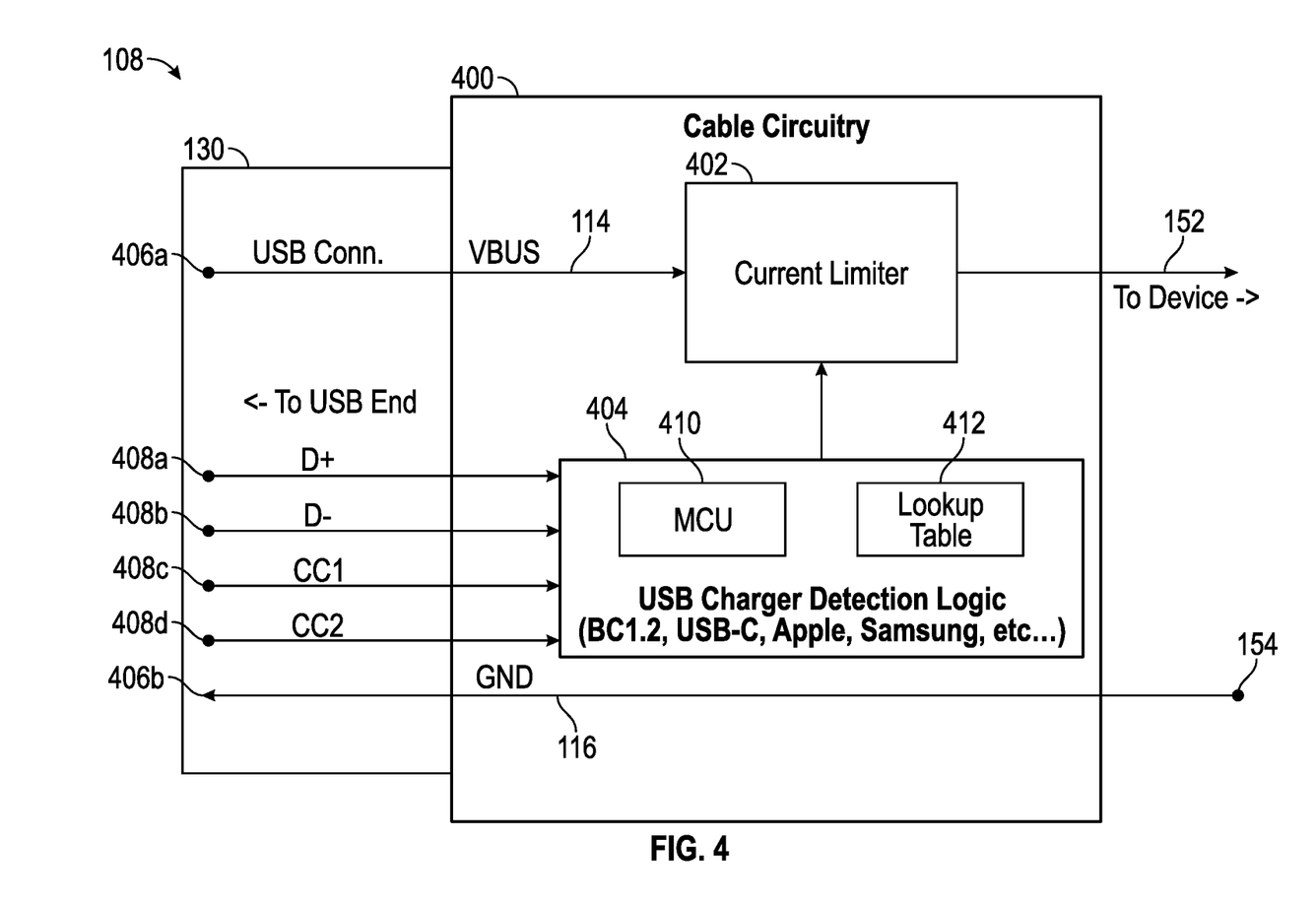
FIG. 4 is a block diagram of an example of the charging cable.

FIG. 4 depicts an example first cable connector 108 of the charging cable 102. The first cable connector 108 includes a housing 400 that supports the connector 130, which is configured to engage a mating connector of the power supply device 106. The housing 400 contains a current limiter 402 and a controller 404. The connector 130 includes multiple power connection pins for engaging corresponding pads in the matting connector of the power supply device 106. In the illustrated example, the power connection pins include a power supply pin 406a coupled the power line 114 and a ground pin 406b coupled to the ground line 115. The connector additionally includes multiple signal connection pins for gathering signal for use in determining charging parameters (e.g., current limit). In the illustrated example, the signal connection pins include a D+ pin 408a, a D− pin 408b, a first configuration pin CC1 408c, and a second configuration pin CC2 408d. As used herein, the terms pin and pad are used interchangeably to refer to electrical connections capable of interconnecting with one another.

The current limiter 402 limits the current that can flow through power line 114 to a set current level. The controller 404 sets the current level of the current limiter 420 responsive to voltage levels and/or data signals on one or more of the signal connection pins. In the illustrated example, the controller 404 includes a microcontroller unit (MCU) 410 and a lookup table 412. Lookup table 412 includes a plurality of current limits associated with voltage levels and/or data signals.

For example, lookup table 412 may include a current limit identifier indication 1.0 Amp when the voltage level on D+ is 2.0 Volts and the voltage level on D− is 2.7 Volts. In accordance with this example, MCU 410 reads a value of 2.0 Volts on D+ and a value of 2.7 Volts on D1; queries lookup table 412 for a current level associated with these values; and retrieves the associated value of 1.0 Amps. MCU 410 may then configure current limiter to limit the current through the power line 114 to 1.0 Amps.

Suitable controllers 404 and current limiters 402 (including single components providing dual functionality) for use within the charging cable 102 will be understood by one of skill in the art from the description herein. For example, the controller 404 may be a field programmable gate array configured to perform the functions of the current limiter 402, MCU 410, and lookup table 412. Alternatively, the current limiter 402 and/or lookup table 412 may be discrete components or integrated components separate from or integrated into the controller 404.

Figure 5:
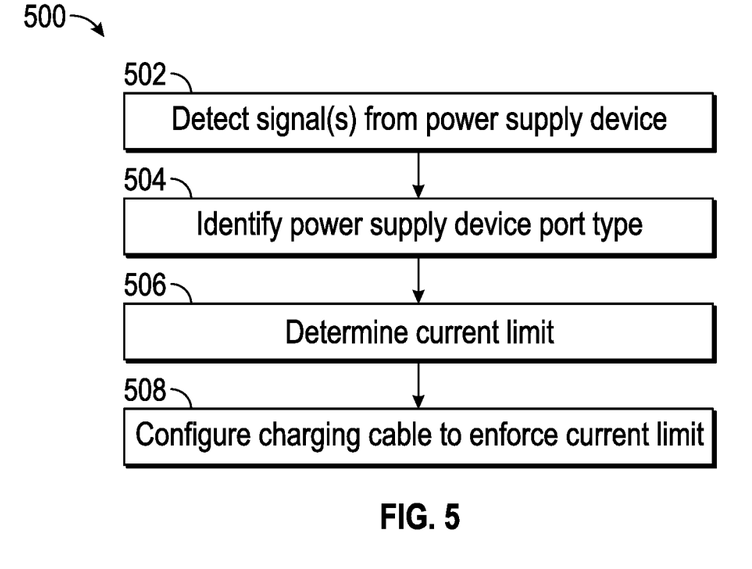
FIG. 5 is a flow chart of example steps performed by the cable circuitry of the charging cable.

FIG. 5 depicts a flow chart 500 of example steps for detecting and configuring a charging cable. Although the steps are described with reference to the charging cable 102, other charging cables suitable for implementing the steps of FIG. 5 will be understood by one of skill in the art from the description herein. Additionally, it is contemplated that one or more of the steps of FIG. 5 may be omitted, performed simultaneously and/or in series, additional steps may be added, and steps may be performed in an order other than illustrated and described.

At step 502, detect signals at the charging cable from the power supply device. In an example, the cable circuitry 132 detects signals from the power supply device 106 via signal pins 408 of connector 130. The signals may be a voltage level(s) and/or data signals on one or more of the signal pins 408. In one example, the signals may be a specific voltage level on D+ and D− of a USB connector. In another example, the signals may be a specific voltage level on D+ and D− of a USB connector followed by data signals exchanged between the cable circuitry 132 and the power supply device 106 via D+ and D− and/or other connections (e.g., CC1 and/or CC2).

Figure 6:
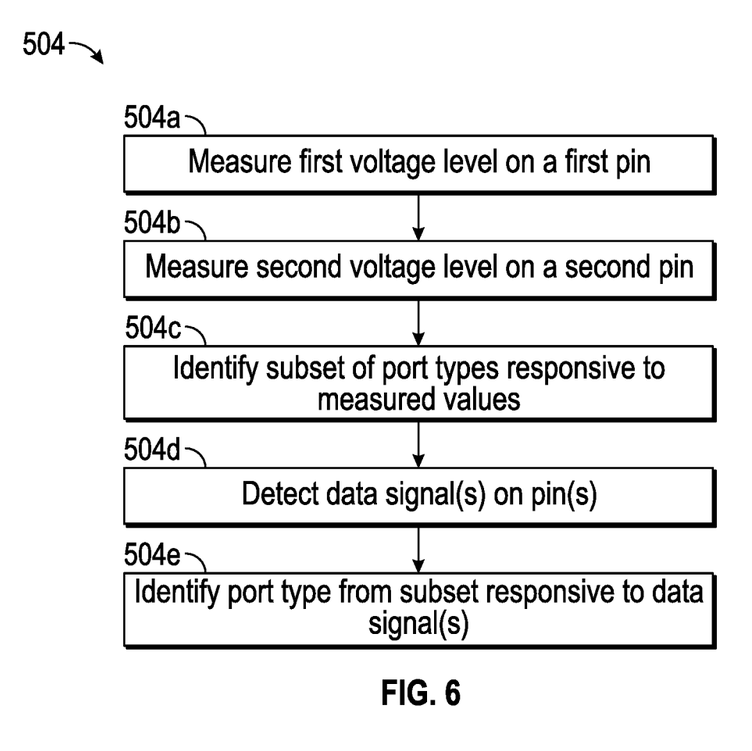
FIG. 6 is a flow chart of example steps performed by the cable circuitry of the charging cable to identify a port type in the flow chart of FIG. 5.

At step 504, the charging cable identifies the power supply device port type. In an example, the cable circuitry 132 identifies the port type of the power supply device 106. FIG. 6 depicts one example for identifying the port type. At step 504a, measure a first voltage level on a first signal pin (e.g., a voltage level on signal pin D+ 408a by MCU 410). At step 504b, measure a second voltage level on a second signal pin (e.g., a voltage level on signal pin D− 408b by the MCU 410). At step 504c, identify a subset of port types responsive to the measured first and second values. In an example, the MCU 410 identifies the subset of port types by querying lookup table 412 responsive to the measured values and retrieves the subset of port types associated with the measured valued from the lookup table 412. At step 504d, detect data signals on the signal pin(s). In an example, the MCU 410 communicates with the power supply device 106 to detect data signals on signal pin(s) 408 (e.g., via one or more of signal pins 408a-d). At step 504e, identify the port type from the subset of port types responsive to the detected data signals. In an example, the MCU 410 identifies the subset of port types by querying lookup table 412 responsive to the detected data signal(s) and identifies the port type associated with the detected data signals from the lookup table 412.

At step 506, the charging cable determines the current limit. In an example, the cable circuitry 132 identifies the current limit. The MCU 410 of cable circuitry 132 may determine the current limit by querying lookup table 412 to identify a current limit associated with a port type matching the port type identified in step 504 and retrieve the identified current limit.

At step 508, configure the charging cable to enforce the current limit. In an example, the MCU 410 configures the current limiter 402 in the power line 114 of the charging cable 102 to limit current flow to the configured limit. Once configured, the current limiter 402 will not allow current levels above the configured limit to pass through the charging cable 102.

Figure 7:
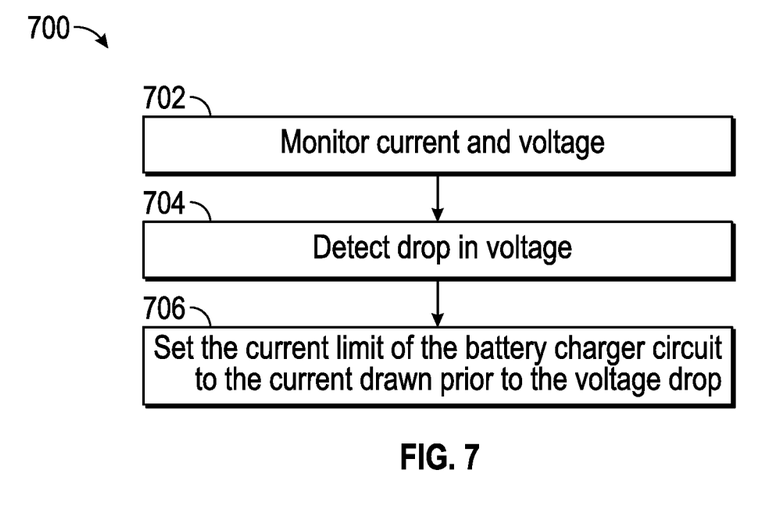
FIG. 7 is a flow chart of example steps performed by the device circuitry of the chargeable electronic device.

FIG. 7 depicts a flow chart 700 of example steps for monitoring and setting current draw in a chargeable electronic device. Although the steps are described with reference to the chargeable electronic device 104, other chargeable electronic devices suitable for implementing the steps of FIG. 7 will be understood by one of skill in the art from the description herein. Additionally, it is contemplated that one or more of the steps of FIG. 7 may be omitted, performed simultaneously and/or in series, additional steps may be added, and steps may be performed in an order other than illustrated and described.

At step 702, monitor current and voltage drawn by the chargeable electronic device. In an example, the device circuitry 120 in the chargeable electronic device 104 monitors current and voltage drawn by the chargeable electronic device 104 via the cable plug 126. For example, MCU 304 may monitor voltage across pads 252 and 254 and current through pad 252 (e.g., via ADC 306).

At step 704, detect a drop in voltage at the chargeable device. In an example, the device circuitry 120 in the chargeable electronic device 104 detects a drop in voltage drawn by the chargeable electronic device 104 via the cable plug 126 during a configuration phase. For example, the MCU 304 may detect a drop in the voltage level across pads 252 and 254 (e.g., via ADC 306) through the monitoring by step 702 during the configuration phase. In an example, the MCU detects voltage drops exceeding a predefined level (e.g., a drop of 10 percent).

At step 706, set the maximum current draw of the battery charger circuit in the chargeable electronic device. In an example, the MCU 304 sets the maximum current draw of the battery charger 302. The MCU may send a signal via an I2C port of the battery charge 302 to configure the battery charger 302 to only draw up to the set maximum current draw.

At step 708, limit the current drawn by the chargeable electronic device to the set maximum current draw. In an example, the battery charger 302 of the chargeable electronic device 104 limits the current drawn by the chargeable electronic device 104. For example, the configured battery charger 302 may be configured to only draw up to the maximum current draw, which is at or below the current limit set by the charging cable 102.

Figure 8:
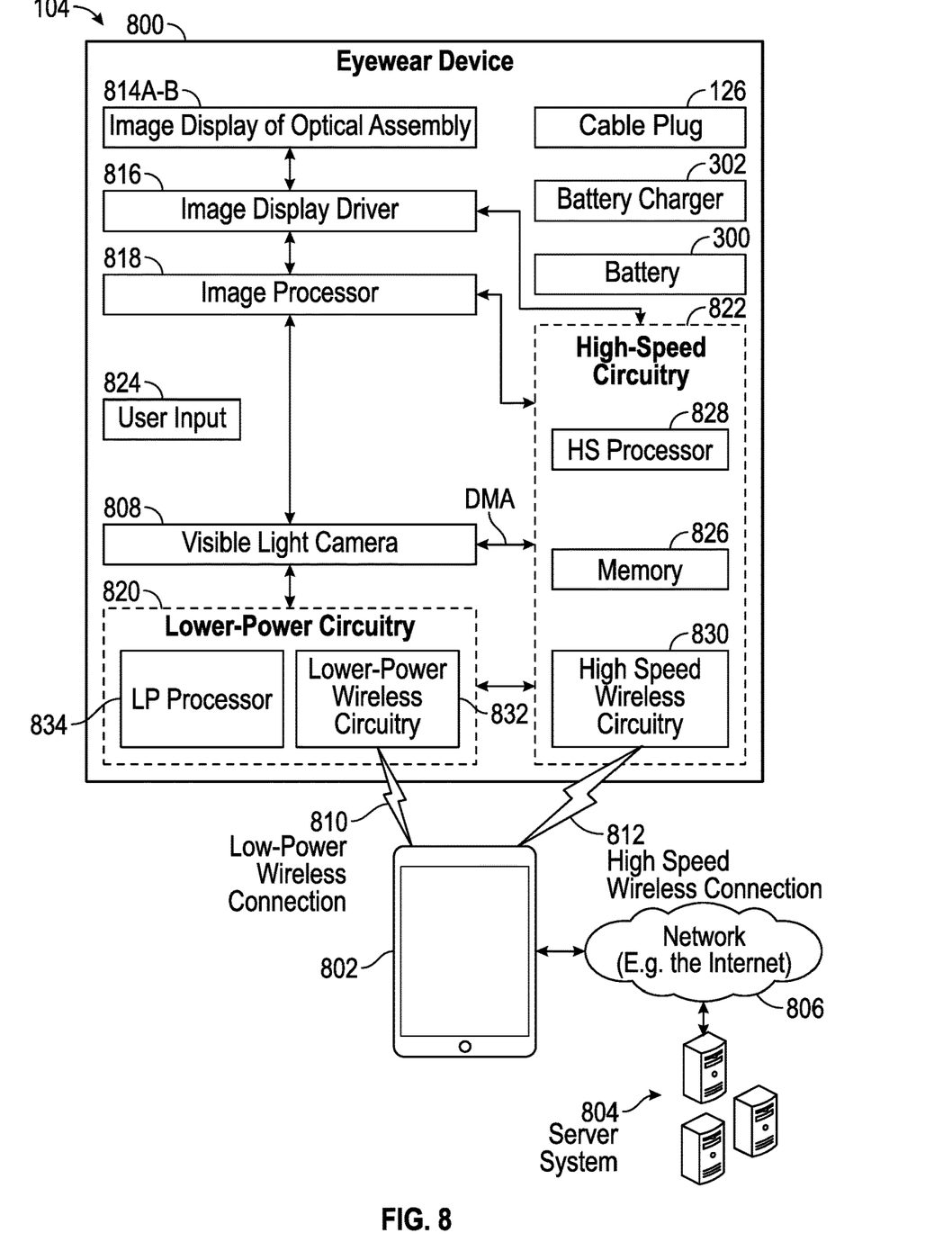
FIG. 8 is a diagrammatic representation of an example chargeable electronic device embodied as an eyewear device in communication with a network via a mobile device.

FIG. 8 is a high-level functional block diagram of an example chargeable electronic device 104 embodied as an eyewear device 800 in communication with a mobile device 802, and a server system 804 connected via various networks 806. The eyewear device 800 includes a cable plug 126, a battery charger 302, and a battery 300. Eyewear device 800 additionally includes visible light cameras 808A-B.

Mobile device 802 may be a smartphone, tablet, laptop computer, access point, or any other such device capable of connecting with eyewear device 800 using both a low-power wireless connection 810 and a high-speed wireless connection 812. Mobile device 802 is connected to server system 804 and network 806. The network 806 may include any combination of wired and wireless connections.

Eyewear device 800 further includes two image displays of an optical assembly 814A-B (one associated with a left lateral side of the eyewear device 800 and one associated with a right lateral side of the eyewear device 800). Eyewear device 800 also includes image display driver 816, image processor 818, low-power circuitry 820, and high-speed circuitry 822. Image display of optical assembly 814A-B are for presenting images and videos.

Image display driver 816 is coupled to the image display of optical assembly 814A-B to control the image display of optical assembly 814A-B to present the images and videos. Eyewear device 800 further includes a user input device 824 (e.g., touch sensor) to receive user selections. In some examples, the user input device 824 includes a movement tracker (e.g., an inertial measurement unit).

The components shown in FIG. 8 for the eyewear device 800 are located on one or more circuit boards, for example a PCB or flexible PCB, in the rims or temples. Alternatively or additionally, the depicted components can be located in the chunks, frames, hinges, or bridge of the eyewear device 800. Left and right visible light cameras 808A-B can include digital camera elements such as a complementary metal-oxide-semiconductor (CMOS) image sensor, charge coupled device, a lens, or any other respective visible or light capturing elements that may be used to capture data, including images of scenes with unknown objects. Eyewear device 800 includes a memory 826 that includes programming to perform a subset or all of the functions described herein for the chargeable electronic device 104.

As shown in FIG. 8, low-power circuitry 820 includes a low power processor 834 and low-power wireless circuitry 832, and high-speed circuitry 822 includes high-speed processor 828, memory 826, and high-speed wireless circuitry 830. In the example, the image display driver 816 is coupled to the high-speed circuitry 822 and operated by the high-speed processor 828 in order to drive the left and right image displays of the optical assembly 814A-B. High-speed processor 828 may be any processor capable of managing high-speed communications and operation of any general computing system needed for an eyewear device 800. High-speed processor 828 includes processing resources needed for managing high-speed data transfers on high-speed wireless connection 812 to a wireless local area network (WLAN) using high-speed wireless circuitry 830. The high-speed processor 828 may execute an operating system such as a LINUX operating system or other such operating system of the eyewear device 800 and the operating system is stored in memory 826 for execution. In addition to any other responsibilities, the high-speed processor 828 executing a software architecture for the eyewear device 800 is used to manage data transfers with high-speed wireless circuitry 830. The high-speed wireless circuitry 830 may be configured to implement Institute of Electrical and Electronic Engineers (IEEE) 802.11 communication standards, also referred to herein as Wi-Fi. Other high-speed communications standards may be implemented by high-speed wireless circuitry 830.

Low-power wireless circuitry 820 and the high-speed wireless circuitry 830 of the eyewear device 800 can include short range transceivers (Bluetooth™) and wireless wide, local, or wide area network transceivers (e.g., cellular or WiFi). Mobile device 802, including the transceivers communicating via the low-power wireless connection 810 and high-speed wireless connection 812, may be implemented using details of the architecture of the eyewear device 800, as can other elements of network 806.

Memory 826 includes any storage device capable of storing various data and applications, including, among other things, camera data generated by the left and right visible light cameras 808A-B and the image processor 818, as well as images generated for display by the image display driver 816 on the image displays of the optical assembly 814A-B. While memory 826 is shown as integrated with high-speed circuitry 822, memory 826 may be an independent standalone element of the eyewear device 800. Electrical routing lines may provide a connection through a chip that includes the high-speed processor 828 from the image processor 818 or a low-power processor 832 to the memory 826. The high-speed processor 828 may manage addressing of memory 826 such that the low-power processor 832 will boot the high-speed processor 828 any time that a read or write operation involving memory 826 is needed.

Figure 9:
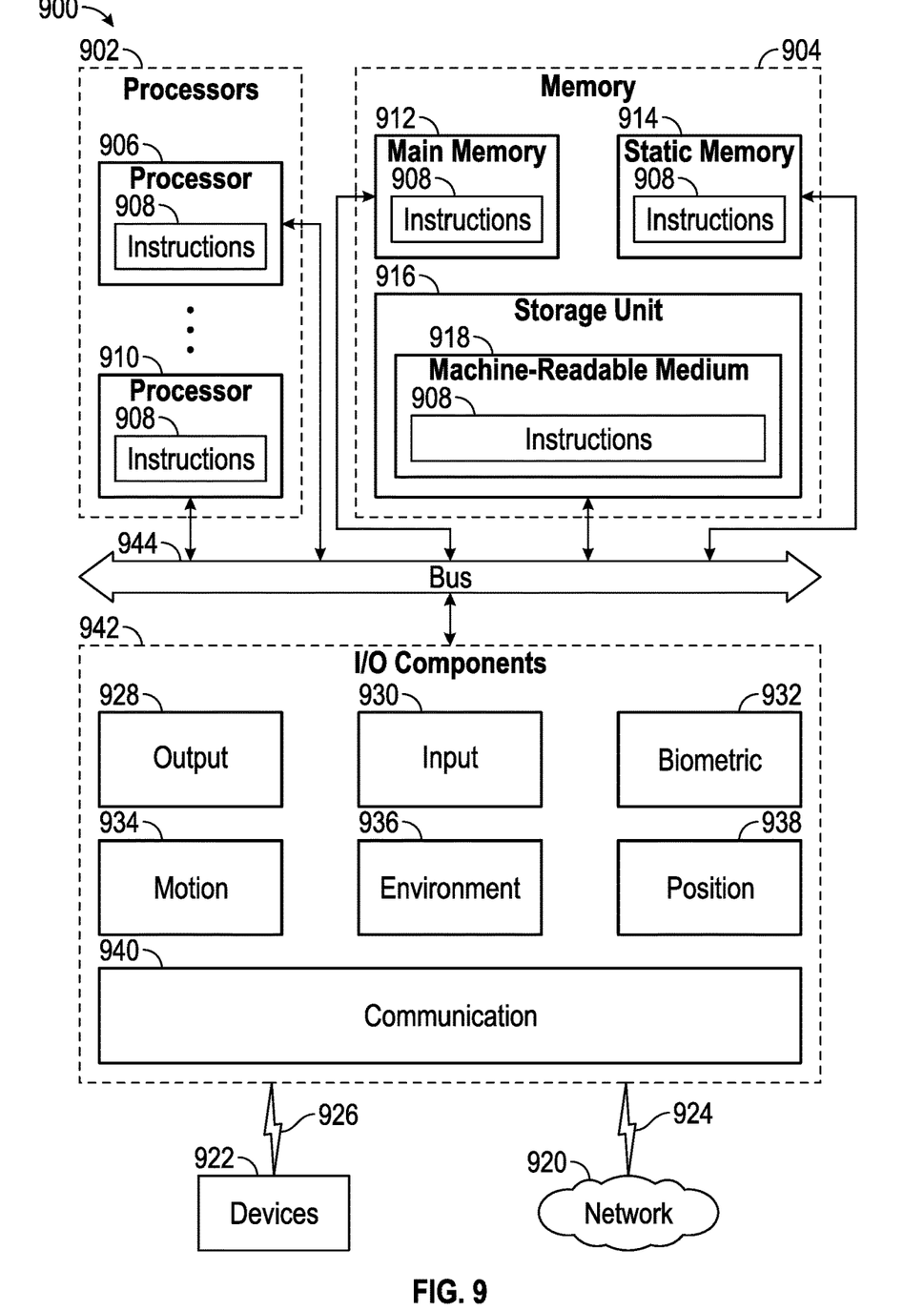
FIG. 9 is a diagrammatic representation of a machine in the form of a computer system within which a set of instructions may be executed for causing the machine to perform any one or more of the methodologies discussed herein, in accordance with examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
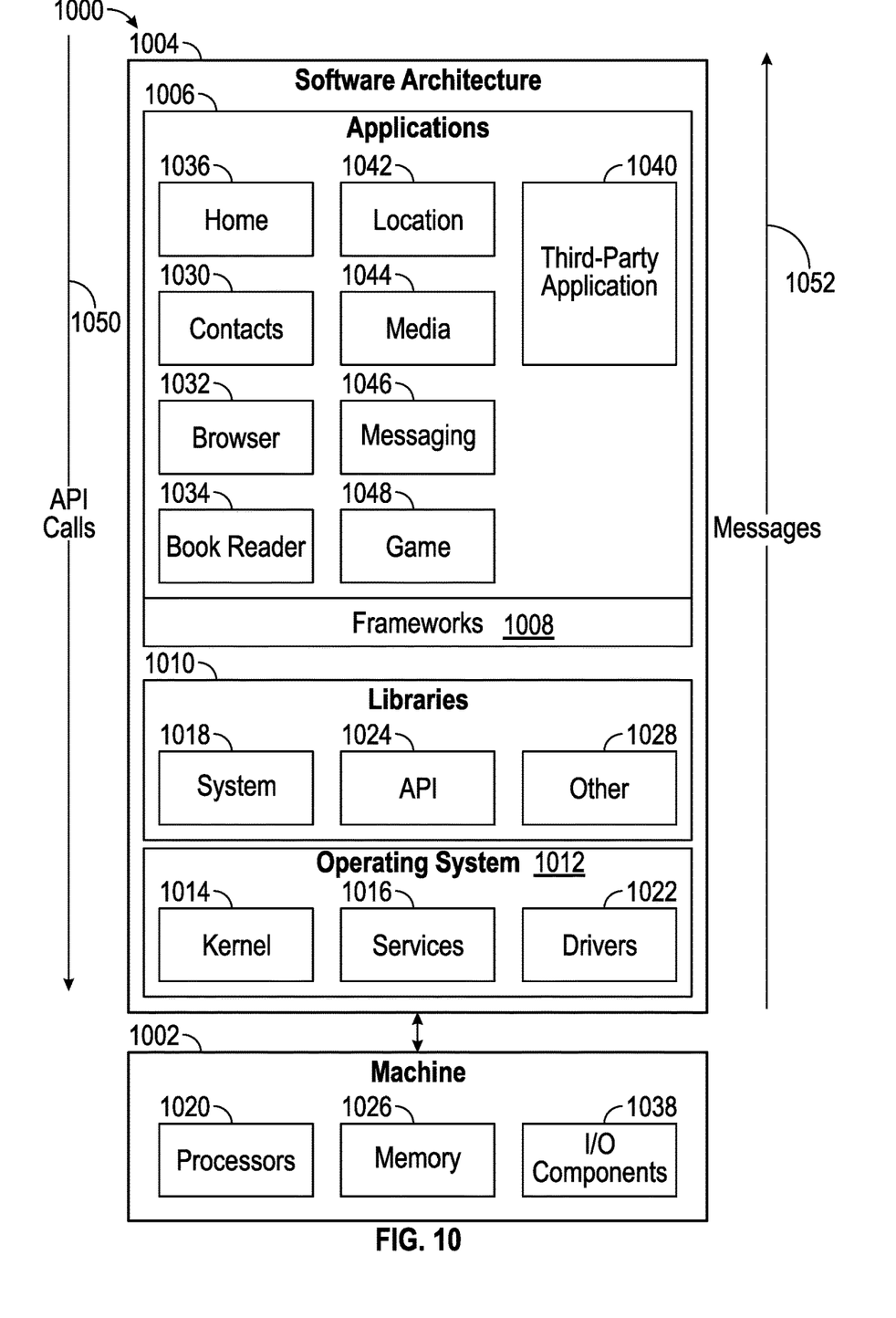
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A charging cable comprising:
   a first connector having power delivery pins for engaging a power supply device, the power delivery pins comprising a first power delivery pin and a second power delivery pin;
   a second connector having power delivery pins for a chargeable electronic device;
   a power delivery bus coupled between the first connector and the second connector to carry charging current;
   a current limiter positioned in the charging cable to selectively limit current flow through the power delivery bus of the charging cable from the power supply device to the chargeable electronic device; and
   a control circuit configured to selectively control the current limiter, the control circuit configured to:
   measure a first voltage level on the first power delivery pin;
   measure a second voltage level on the second power delivery pin;
   identify a port type for the power supply device from a plurality of port types using the first and second measured voltage levels;
   determine a current limit responsive to the identified port type; and
   configure the current limiter to limit the current flow to the determined current limit through the power delivery bus of the charging cable to the chargeable electronic device in accordance with the identified port type for the power supply.

2. The charging cable of claim 1, wherein the first connector includes a housing containing the current limiter and the control circuit.

3. The charging cable of claim 2, further comprising:
a flexible sheath surrounding the power delivery bus and extending between the housing of the first connector and the second connector.

4. The charging cable of claim 1, the first connector further having signal pins, wherein the control circuit comprises:
a lookup table including a plurality of port types, each port type associated with one or more identification values and a current limit value; and
a microcontroller unit coupled to the lookup table and between the signal pins and the current limiter;
wherein the microcontroller unit is configured to detect at least one signal on at least one of the signal pins, identify at least one characteristic value from the at least one signal, match the at least one identified characteristic value to the one or more identification values associated with the plurality of port types in the lookup table, identify a port type from the plurality of port types having matching characteristic values, select the current limit from the lookup table associated with the identified port type, and configure the current limiter to limit the current flow through the power delivery bus.

5. The charging cable of claim 4, wherein the second connector does not include signal pins.

6. The charging cable of claim 1, the first connector further having signal pins, wherein the control circuit comprises a field programmable gate array configured to implement logic to detect at least one signal on at least one of the signal pins, identify at least one characteristic value from the at least one signal, match the at least one identified characteristic value to one or more identification values associated with a plurality of port types, identify a port type from the plurality of port types having matching characteristic values, select the current limit associated with the identified port type, and configure the current limiter to limit the current flow through the power delivery bus.

7. A system comprising:
a chargeable electronic device, including:
a battery;
a battery charger circuit coupled to the battery; and
contact pads coupled to the battery charger circuit; and
a charging cable including:
a first connector having power delivery pins for engaging a power supply device, the power delivery pins comprising a first power delivery pin and a second power delivery pin;
a second connector having power delivery pins for a chargeable electronic device;
a power delivery bus coupled between the first connector and the second connector to carry charging current;
a current limiter positioned in the charging cable to selectively limit current flow through the power delivery bus of the charging cable from the power supply device to the contact pads of the of the chargeable electronic device; and
a control circuit configured to selectively control the current limiter, the control circuit configured to:
measure a first voltage level on the first power delivery pin;
measure a second voltage level on the second power delivery pin;
identify a port type for the power supply device from a plurality of port types using the first and second measured voltage levels;
determine a current limit responsive to the identified port type, and
configure the current limiter to limit the current flow to the determined current limit through the power delivery bus of the charging cable to the contact pads of the chargeable electronic device in accordance with the identified port type for the power supply.

8. The system of claim 7, wherein the chargeable electronic device further comprises:
a device controller; and
an analog to digital converter coupled between the contact pads of the chargeable electronic device and the device controller to convert an analog voltage across the contact pads of the chargeable electronic device to a digital voltage signal for processing by the device controller.

9. The system of claim 7, wherein the first connector includes a housing containing the current limiter and the control circuit.

10. The system of claim 9, wherein the charging cable further comprises:
a flexible sheath surrounding the power delivery bus and extending between the housing of the first connector and the second connector.

11. The system of claim 7, the first connector further having signal pins, wherein the control circuit comprises:
a lookup table including a plurality of port types, each port type associated with one or more identification values and a current limit value; and
a microcontroller unit coupled to the lookup table and between the signal pins and the current limiter;
wherein the microcontroller unit is configured to detect at least one signal on at least one of the signal pins, identify at least one characteristic value from the at least one signal, match the at least one identified characteristic value to the one or more identification values associated with the plurality of port types in the lookup table, identify a port type from the plurality of port types having matching characteristic values, select the current limit from the lookup table associated with the identified port type, and configure the current limiter to limit the current flow through the power delivery bus.

12. The system of claim 11, wherein the second connector does not include signal pins.

13. The system of claim 7, the first connector further having signal pins, wherein the control circuit comprises a field programmable gate array configured to implement logic to detect at least one signal on at least one of the signal pins, identify at least one characteristic value from the at least one signal, match the at least one identified characteristic value to one or more identification values associated with a plurality of port types, identify a port type from the plurality of port types having matching characteristic values, select the current limit associated with the identified port.

14. A method for identifying and enforcing current limitations of a power supply device with a charging cable configured to deliver power through a power delivery bus of the charging cable from the power supply device to a chargeable electronic device, the method comprising:
measuring a first voltage level on a first power delivery pin;
measuring a second voltage level on a second power delivery pin;

identifying a port type for the power supply device from a plurality of port types using the first and second measured voltage levels;

determining a current limit responsive to the identified port type, and configuring a current limiter of the charging cable to limit current flow to the determined current limit through the power delivery bus of the charging cable to the chargeable electronic device in accordance with the identified port type for the power supply device.

15. The method of claim 14, wherein the charging cable further comprises signal pins and wherein identifying the port type comprises:

identifying a subset of port types by comparing the first and second measured voltages and matching the compared first and second measured voltages to values corresponding to the subset of port types;

detecting at least one signal on at least one of the signal pins; and identifying the port type corresponding to the current limit of the power supply device from the subset of port types by matching the at least one signal to values corresponding to the port type.

16. The method of claim 15, wherein the determining the current limit comprises:

identifying at least one characteristic value from the at least one signal;

matching the at least one identified characteristic value to one or more identification values associated with the subset of port types in a lookup table;

identifying the port type having matching characteristic values from the subset of port types; and determining the current limit from the identified port type having matching characteristic values from the subset of port types.

17. The method of claim 14, wherein the determining comprises:

selecting the current limit from a lookup table associated with the identified port type.

18. The method of claim 14, further comprising:

controlling current drawn by a battery charger circuit of the chargeable electronic device while charging a battery of the chargeable electronic device by:

monitoring voltage levels across contact pads of the chargeable electronic device and current through the power delivery bus;

detecting a drop in voltage across the contact pads due to a level of the current drawn by the battery charger circuit exceeding the current limit due to the current limiter of the charging cable; and responsive to the detected drop in voltage, set a maximum current draw of the battery charger circuit to the current drawn by the battery charger circuit just before the detected drop in voltage.

19. A non-transitory processor-readable storage medium storing processor-executable instructions identifying and enforcing current limitations of a power supply device with a charging cable configured to deliver power through a power delivery bus of the charging cable from the power supply device to a chargeable electronic device that, when executed by a processor of a machine, cause the machine to perform operations comprising:

measuring a first voltage level on a first power delivery pin;

measuring a second voltage level on a second power delivery pin;

identifying a port type for the power supply device from a plurality of port types using the first and second measured voltage levels;

determining a current limit responsive to the identified port type, and configuring a current limiter of the charging cable to limit current flow to the determined current limit through the power delivery bus of the charging cable to the chargeable electronic device in accordance with the identified port type for the power supply.

20. The non-transitory processor-readable storage medium of claim 19, wherein the determining operation comprises:

selecting the current limit from a lookup table associated with the identified port type.

* * * * *